United States Patent
Thomas

(10) Patent No.: US 8,292,322 B2
(45) Date of Patent: Oct. 23, 2012

(54) SUPPLEMENTAL INFLATABLE RESTRAINT SYSTEM WITH HUSH PANEL HOUSING

(75) Inventor: Scott D. Thomas, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1253 days.

(21) Appl. No.: 11/958,631

(22) Filed: Dec. 18, 2007

(65) Prior Publication Data

US 2009/0152839 A1    Jun. 18, 2009

(51) Int. Cl.
*B60R 21/16* (2006.01)

(52) U.S. Cl. .................................. 280/728.2; 280/730.1

(58) Field of Classification Search ............... 280/730.1, 280/728.3, 728.2
See application file for complete search history.

(56) References Cited

U.S. PATENT DOCUMENTS

| | | | | |
|---|---|---|---|---|
| 3,618,977 A | * | 11/1971 | Klove et al. ................. | 280/730.1 |
| 4,948,168 A | * | 8/1990 | Adomeit et al. .............. | 280/732 |
| 5,971,431 A | * | 10/1999 | Wohllebe et al. ............. | 280/732 |
| 6,854,759 B2 | * | 2/2005 | Schwark et al. ............ | 280/730.1 |
| 7,201,396 B2 | * | 4/2007 | Takimoto et al. ........... | 280/730.1 |
| 7,213,834 B2 | * | 5/2007 | Mizuno et al. .............. | 280/730.1 |
| 7,232,149 B2 | * | 6/2007 | Hotta et al. ................. | 280/730.1 |
| 2002/0171231 A1 | * | 11/2002 | Takimoto et al. ........... | 280/730.1 |
| 2005/0140123 A1 | * | 6/2005 | Hotta et al. ................. | 280/730.1 |
| 2006/0071459 A1 | * | 4/2006 | Hayakawa et al. ......... | 280/730.1 |
| 2007/0126212 A1 | * | 6/2007 | Takimoto et al. ........... | 280/730.1 |
| 2007/0200322 A1 | * | 8/2007 | Sakakida .................... | 280/730.1 |
| 2007/0267852 A1 | * | 11/2007 | Enders ........................ | 280/730.1 |
| 2008/0079245 A1 | * | 4/2008 | Bito ........................... | 280/730.1 |

* cited by examiner

*Primary Examiner* — Faye M. Fleming
(74) *Attorney, Agent, or Firm* — Quinn Law Group, PLLC

(57) ABSTRACT

A supplemental inflatable restraint system is provided for use with a vehicle having an instrument panel at a forward end therein. A hush panel, which defines a cavity configured to nest the SIR therein, is attached to a lower portion of the instrument panel. The cavity has an opening facing in a generally downward direction. A cushion is operable to transition through the opening from a non-expanded state, in which the cushion is inside the cavity, to an expanded state, in which the cushion is outside the cavity. A fluid dispensing apparatus regulates transition of the cushion from the non-expanded to the expanded state. A closeout door is attached to the hush panel to cover the cushion, and transition from a closed to an open position. The hush panel acts as a structural reaction surface for the cushion, and is generally not visible to a vehicle occupant seated upright and adjacent thereto.

20 Claims, 3 Drawing Sheets

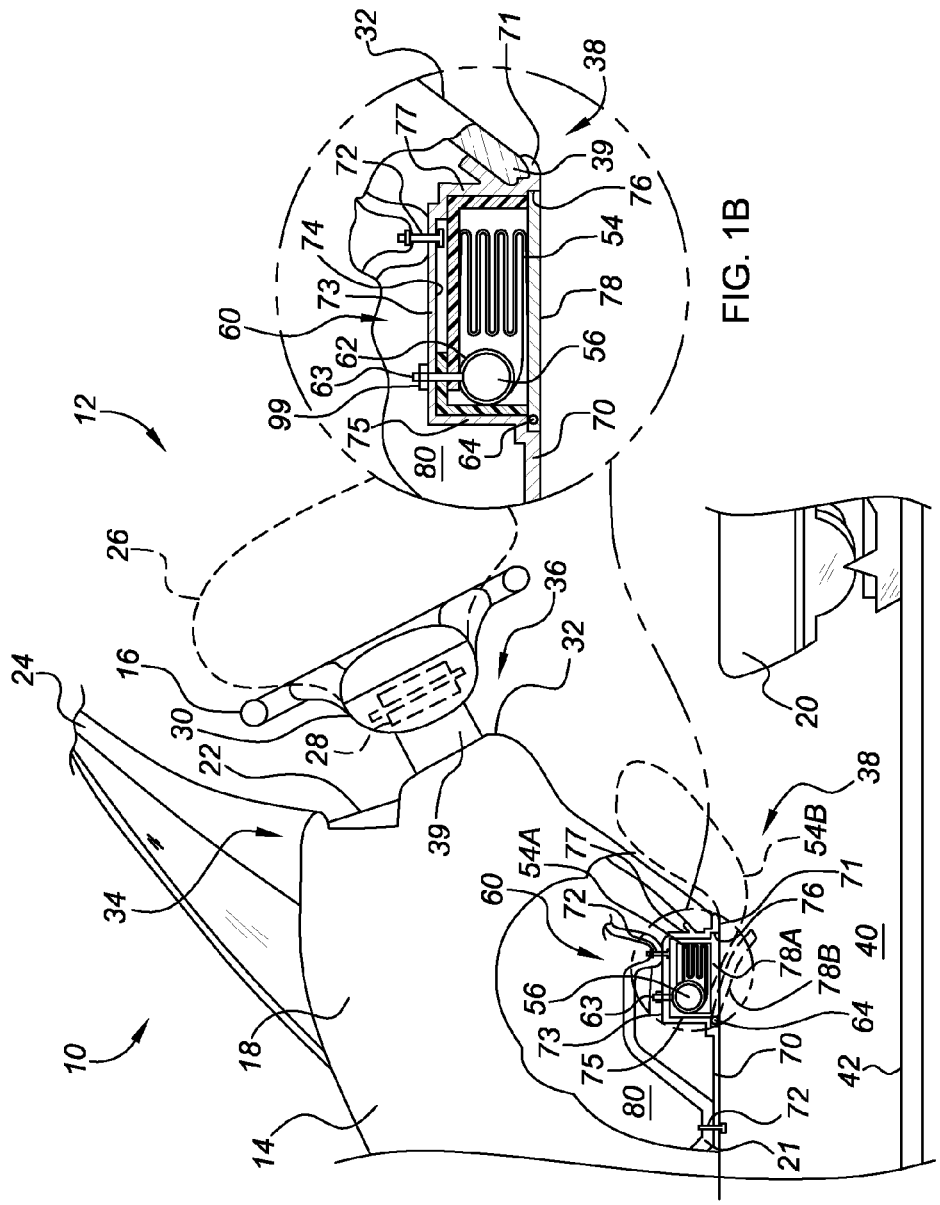

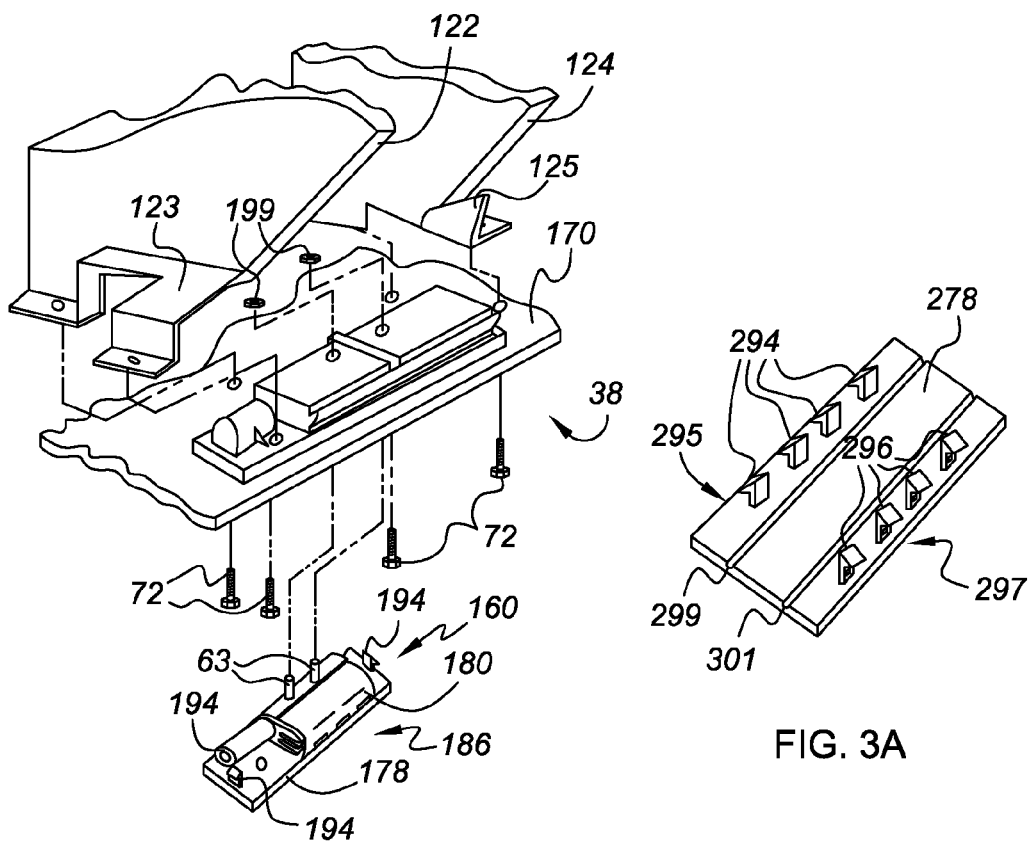
FIG. 2B
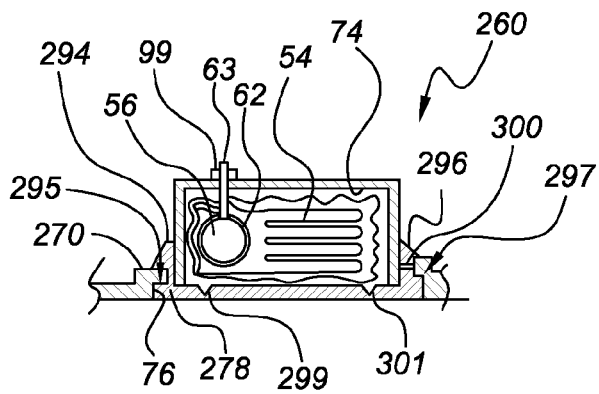
FIG. 3
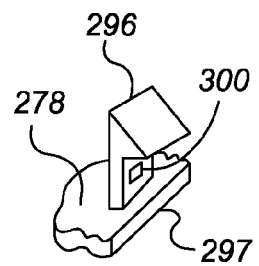
FIG. 3A
FIG. 3B

SUPPLEMENTAL INFLATABLE RESTRAINT SYSTEM WITH HUSH PANEL HOUSING

TECHNICAL FIELD

The present invention relates generally to inflatable restraint systems for use in motorized vehicles, and more particularly to supplemental inflatable restraint systems deployable for the knees and lower extremities.

BACKGROUND OF THE INVENTION

Inflatable airbag devices, which are now more commonly referred to in the art as Supplementary Restraint Systems (SRS), Air Cushion Restraint Systems (ACRS), or Supplemental Inflatable Restraint (SIR) Systems, are originally equipped in almost all present day automotive vehicles. Airbag devices are generally located in the passenger compartment of automotive vehicles, and act as a selectively deployable cushion capable of attenuating kinetic energy.

Traditional airbag devices comprise an inflatable airbag module stored either behind the vehicle instrument panel (e.g., for passenger-side airbags), or mounted to the steering wheel hub (e.g., for driver-side airbags). A plurality of sensors or similar devices is strategically located to detect the onset of a predetermined event. The sensor(s) responsively activates an inflation device, internally located in the airbag module, to produce a flow of inflating gas into an inflatable flexible membrane (i.e., an airbag cushion), also located within the airbag module. This causes the airbag cushion to be deployed in a rearward direction within the vehicle passenger compartment.

Many automotive vehicles are currently being designed with a supplemental inflatable restraint system located on a downward and forwardly inclined portion of the instrument panel, commonly identified as the "knee bolster". The knee airbag can be extended so as to restrain the lower half of the occupant. During a predetermined event, the knee airbag is inflated, traditionally passing or breaking through a rearward-facing, exterior show surface of the knee bolster, in a manner similar to that described above.

SUMMARY OF THE INVENTION

The present invention provides a supplemental inflatable restraint (SIR) system for a motorized vehicle having a passenger compartment with an instrument panel at a forward end therein. The SIR includes a panel member attached to the lower portion of the instrument panel—e.g., via a plurality of non-releasing fasteners. The panel member defines a cavity with an opening facing in a generally downward direction. The cavity is configured to nest the SIR therein. Ideally, the panel member is characterized by an absence of an outer surface with an appearance finish. As used herein, the term "appearance finish" should be defined or interpreted to indicate a surface refinement such as, but not limited to, a coating, varnish, paint, polish, shine, glaze, texturing, staining, topical treatment or laminate, and a leather, plastic, or cloth wrapping. In addition, the panel member preferably includes a lip portion extending generally rearward with respect to the vehicle and wrapping around a bottom edge of the lower portion of the instrument panel.

An inflatable cushion is operable to transition through the opening from a non-expanded state, in which the cushion is inside the cavity, to an expanded state, in which the cushion is substantially outside the cavity. A fluid dispensing apparatus is in operative fluid communication with the cushion to selectively regulate transition of the cushion from the non-expanded state to the expanded state. To this regard, the panel member is preferably configured to act as a reaction surface for the inflatable cushion when transitioning from the non-expanded state to the expanded state.

According to one aspect of the present embodiment, the SIR includes a closeout door operatively attached to the panel member, and configured to cover the cushion when in the non-expanded state. The cushion is in communication with the closeout door and operable to transition the closeout door from a first substantially closed position to a second generally open position. The closeout door can pivot about a generally laterally oriented hinge portion to transition from the first substantially closed position to the second generally open position. In this instance, the laterally oriented hinge portion is preferably either a butt hinge or a plurality of fasteners, rivets, screws, or bolts.

Alternatively, the closeout door includes a plurality of snap fasteners oriented along an outer periphery thereof. Each snap fastener is configured to mate with a respective portion of the panel member and thereby temporarily retain the closeout door in the first substantially closed position. One or more of the fasteners can be fabricated with an indentation or slot that is configured to weaken the respective fastener.

A penetrable membrane is preferably wrapped around the inflatable cushion to thereby attach the cushion to the closeout door when in the non-expanded state. Ideally, the penetrable membrane includes substantially opposing forward and rearward flaps, each of which is attached along a respective first end to the closeout door. The forward and rearward flaps each define one or more apertures extending through a respective second end thereof. Each of the apertures on the forward flap is oriented along its respective second end so as to align with a corresponding aperture on the rearward flap and thereby define a channel that is configured to receive a fastener element therethrough. The rearward flap preferably includes a tear seam or a plurality of weakening features extending generally parallel to the first end and adjacent to the closeout door.

According to another embodiment of the present invention, a knee airbag apparatus is provided for use with a motorized vehicle having an instrument panel. The instrument panel has upper and lower portions extending in a generally rearward direction relative to the motorized vehicle, and a middle portion extending therebetween. A hush panel is attached to the lower portion of the instrument panel—e.g., via a plurality of non-releasing fasteners. The hush panel defines a cavity with an opening facing in a generally downward direction relative to the vehicle. The cavity is configured to receive and nest the knee airbag apparatus therein. The hush panel is positioned such that it is substantially nonvisible to a vehicle occupant seated upright and adjacent thereto.

An inflatable cushion is operable to transition through the opening from a non-expanded state, in which the cushion is inside the cavity, to an expanded state, in which the cushion is substantially outside the cavity. A fluid dispensing apparatus is in fluid communication with the cushion to selectively regulate transition of the cushion from the non-expanded state to the expanded state. A closeout door is operatively attached to the hush panel to cover the cushion when in the non-expanded state. The closeout door is configured to transition from a first substantially closed position to a second generally open position. The hush panel acts as a reaction surface for the inflatable cushion when transitioning from the non-expanded state to the expanded state.

According to yet another embodiment of the present invention, a motorized vehicle is provided, which includes an instrument panel disposed at a forward end therein and a supplemental inflatable restraint system. The instrument panel has upper and lower portions extending rearward relative to the vehicle, and a middle portion extending therebetween. The upper and middle portions include an exterior surface characterized by an appearance finish.

The supplemental inflatable restraint system includes a hush panel attached to the lower portion of the instrument panel. The hush panel defines a cavity with an opening facing in a generally downward direction relative to the vehicle. The cavity is configured to receive and nest the supplemental inflatable restraint system therein. The hush panel is positioned within the vehicle such that it is substantially nonvisible to a vehicle occupant seated upright and adjacent thereto. As such, the hush panel is characterized by an absence of an exterior surface with an appearance finish.

An inflatable cushion is operable to transition through the opening from a non-expanded state, in which the cushion is inside the cavity to an expanded state, in which the cushion is substantially outside the cavity. A fluid dispensing apparatus is in fluid communication with the cushion to selectively regulate transition of the cushion from the non-expanded state to the expanded state. A closeout door is operatively attached to the hush panel to cover the cushion when in the non-expanded state. The cushion is operable to transition the closeout door from a first substantially closed position to a second generally open position.

The above features and advantages, and other features and advantages of the present invention, will be readily apparent from the following detailed description of the preferred embodiments and best modes for carrying out the present invention when taken in connection with the accompanying drawings.

BRIEF DESCRIPTION OF THE DRAWINGS

FIG. 1A is a partially cut-away side-view illustration inside of the passenger compartment of a representative motorized vehicle for using the supplemental inflatable restraint systems of the present invention;

FIG. 1B is an enlarged side-view illustration of the instrument panel of FIG. 1A partially cut away to illustrate a knee airbag apparatus in accordance with one embodiment of the present invention;

FIG. 2B is an exploded perspective illustration depicting the knee airbag apparatus of FIG. 2A being attached to a vehicle instrument panel;

FIG. 3 is a side cross-sectional illustration of a knee airbag apparatus in accordance with another alternate embodiment of the present invention;

FIG. 3A is an elevated isometric illustration of the closeout door of FIG. 3 provided to depict one arrangement of a plurality of snap fastener elements about an outer periphery thereof; and FIG. 3B is a perspective illustration of the closeout door of FIG. 3A mostly broken away to illustrate a snap fastener element with an indentation or slot therethrough that is configured to controllably weaken the snap fastener.

DESCRIPTION OF THE PREFERRED EMBODIMENTS

Figure 2A:
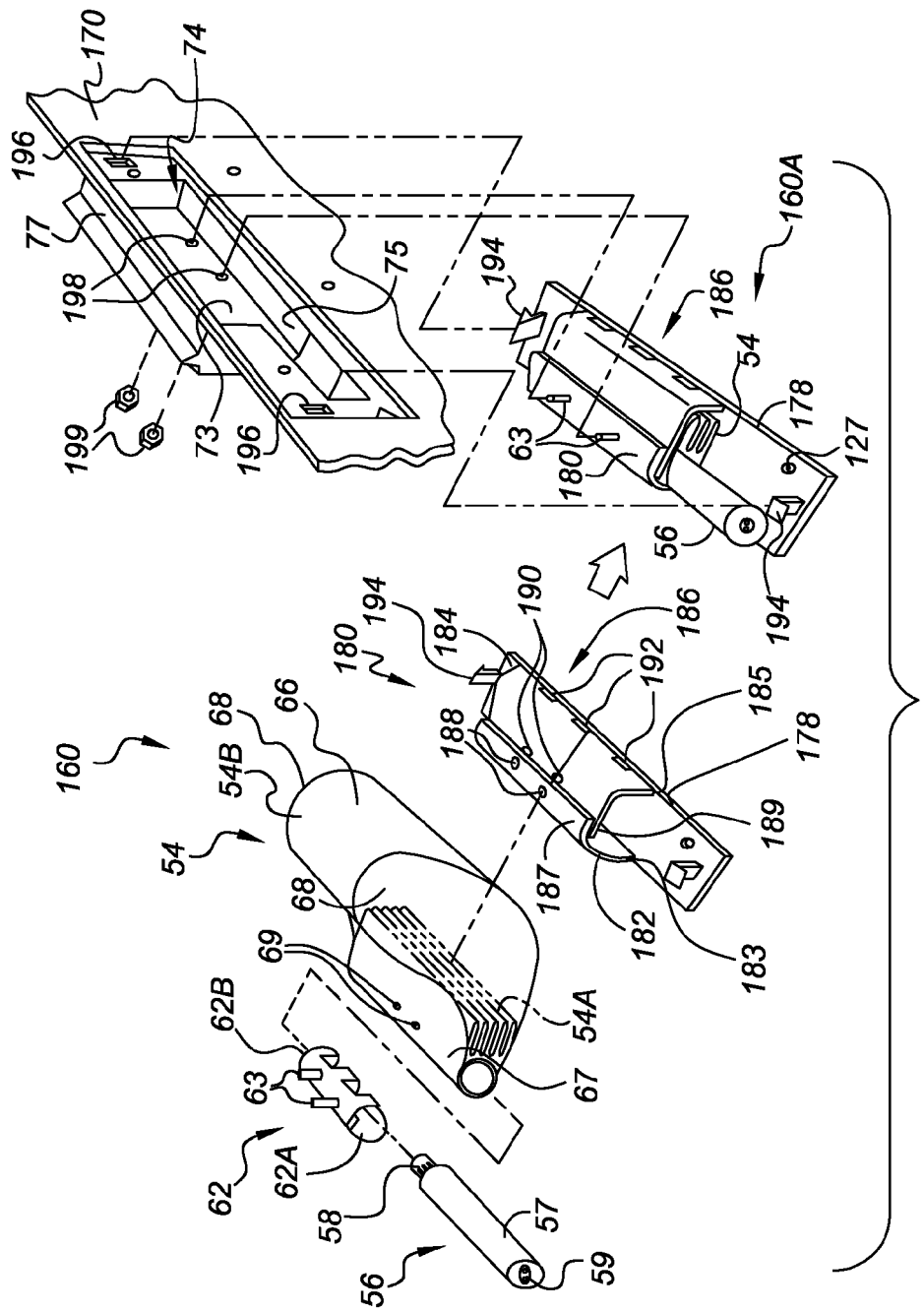
FIG. 2A is an exploded perspective view of a knee airbag apparatus in accordance with an alternate embodiment of the present invention.

Referring to the Figures, wherein like reference numerals refer to like components throughout the several views, shown generally at 10 in FIG. 1A is an exemplary motor vehicle for using the supplemental inflatable restraint (SIR) systems of the present invention. FIG. 1A is provided merely for explanatory purposes, the dimensions and relative orientation of the constituent members being intentionally exaggerated for clarity and for a better understanding of the present invention. As such, the present invention is by no means limited to the particular structure or layout presented herein. By way of example, the supplemental inflatable restraint systems of the present invention can be incorporated into any vehicle platform, such as, but not limited to, coupe-type passenger cars, sedan-type passenger cars, light trucks, heavy duty vehicles, vans, buses, airplanes, trains, etc.

The vehicle 10 includes an interior compartment—i.e., a passenger compartment, indicated generally at 12, and vehicle interior structure, identified partially at 14. The vehicle interior structure 14 is represented collectively herein by a steering wheel 16, an instrument panel 18, one or more seat assemblies 20, and an A-pillar 24, but may also include a headliner, one or more door assemblies, etc. The instrument panel 18 houses, for example at the driver side, an electronic instrument cluster 22 with various digital or analog gauges—e.g., speedometer, odometer, and tachometer (not shown), or, at the front passenger side, a glove compartment (not shown). A traditional "driver-side" airbag assembly is shown in FIG. 1A in an inflated condition, indicated with hidden lines 26 and 28. Specifically, the traditional airbag assembly is represented by an inflatable bag 26 extending from an airbag module 28 mounted to a wheel hub 30 of the steering wheel 16.

The instrument panel 18 includes an exterior surface 32 having upper, middle, and lower portions, indicated generally by reference numerals 34, 36 and 38, respectively. As can be seen in FIG. 1A, the upper and lower portions 34, 38 extend in a generally rearward direction relative to the vehicle 10, with the middle portion 36 extending therebetween in a generally vertical orientation, and angled in a generally forward direction both above and below the steering column 39. Of notable importance, the upper and middle portions 34, 36 of the instrument panel exterior surface 30 are defined as "A-Surfaces", generally characterized as having an aesthetically appealing, customer visible appearance finish. In direct contrast, the lower (underside) portion 38 of the instrument panel exterior surface 30 is defined as a "B-Surface", generally characterized as not having an appearance finish. As used herein, the term "appearance finish" should be defined or interpreted to indicate a surface refinement such as, but not limited to, a coating, varnish, paint, polish, shine, glaze, texturing, staining, topical treatment or laminate, and a leather, plastic, or cloth wrapping.

Turning to FIG. 1B, an enlarged side-view illustration of the instrument panel 18 of FIG. 1A is shown partially broken away to illustrate a supplemental inflatable restraint system or knee airbag apparatus, indicated generally at 60, in accordance with one embodiment of the present invention. The knee airbag apparatus 60 is positioned within the lower portion 38 of the instrument panel 18, along an underside transition section, generally facing foot space 40. More specifically, a hush panel 70 (which may also be referred to herein as a closeout panel or a panel member) is operatively attached—e.g., to panel substrate 21 via a plurality of threaded non-releasable fasteners 72, to the lower portion 38 of the instrument panel 18. The hush panel 70 defines a cavity 74 that extends generally upward and into an internal hollow or compartment 80 of the instrument panel 18. The cavity 74 acts as a housing member, configured to receive and nest the constituent parts of the knee airbag apparatus 60 therein, as will be discussed in further detail hereinbelow with respect to FIGS. 2A and 2B. The cavity 74 has an opening or deployment port 76 formed in the external surface 30 of the instrument panel 18, facing in a generally downward direction relative to the vehicle 10.

As a section of the lower portion 38 of the instrument panel exterior surface 30, the hush panel 70 is also defined as a "B-Surface" and, thus, generally characterized as not having an appearance finish. The hush panel 70 is oriented along the instrument panel 18 such that it remains substantially nonvisible to a vehicle occupant (not shown) seated upright and adjacent thereto—e.g., in seat assembly 20. In other words, the hush panel 70 is positioned low and forward enough (e.g., 330 millimeters (mm) from the floor 42) in the passenger compartment 12 such that the normally seated occupant will not be able to see most, if not all of the hush panel 70—i.e., below the sightline of the instrument panel 18. However, it should be noted that in some designs, the hush panel 70 may extend up the middle portion 36 of the instrument panel 18 a slight amount so that a small portion of the hush panel 70 may be visible to the occupant. In this case, a complimentary color is selected for the hush panel 70 so that it does not stand out relative to the remainder of the middle portion 36 of the instrument panel 18.

The knee airbag apparatus 60 also includes an inflatable cushion or flexible membrane 54 and an inflation fluid dispensing apparatus 56 (or inflator) attached to the hush panel 70, inside cavity 74. As best seen in FIG. 2A, the inflator 56 has a generally cylindrical body 57 acting as a pressure vessel portion used to store inflation gas. A discharge port 58 is located at one end of the cylindrical inflator body 57 such that it is remote from an opposing, second end having an electrical terminal 59 adapted to receive an activation signal. A formed or extruded, preferably metal sleeve member 62 has a generally cylindrical geometry with opposing open ends 62A and 62B. The sleeve member 62 is sufficiently sized to surround, and securely hold the cylindrical inflator body 57 therein. At least one, but preferably two mounting studs 63 extend from the sleeve member 62 so as to attach or secure the inflator 56 and cushion 54 to the hush panel 70. Preferably, the studs 63 extend through the upper wall portion 75 of cavity 74 to mate with retaining nuts 99, as will be discussed in detail hereinbelow.

Sensors (not shown) mounted to the vehicle 10 may be connected in signaling communication with the inflation fluid dispensing apparatus 56—e.g., via electrical terminal 59. Under certain predetermined conditions, the sensors emit a signal(s) to the inflation fluid dispensing apparatus 56 to regulate inflation of the inflatable cushion 54. The knee airbag apparatus 60 may be used in conjunction with, or independent of a traditional airbag assembly—i.e., inflatable bag 26 and airbag module 28 of FIG. 1A.

The inflation fluid dispensing apparatus 56 is selectively actuatable to provide a fluid, preferably a pressurized gas such as nitrogen, argon, or carbon dioxide, for deploying the cushion 54 outward into the interior compartment 12 of FIG. 1A. For example, the inflatable cushion 54 is shown in a first, non-expanded stowable state with solid lines at 54A in FIG. 1A, wherein the inflatable cushion 54 is inside the cavity 74 in a generally folded condition. The inflatable cushion 54 is also shown in a second, expanded state with hidden lines, indicated at 54B in FIG. 1A, in which the inflatable cushion 54 is substantially outside the cavity 74 in an inflated condition. The hush panel 70 optionally includes a lip portion 71 extending generally rearward with respect to the vehicle 10. The lip portion 71 wraps around a bottom edge 39 of the lower portion 38 of the instrument panel 18 to provide a cooperative, unobstructed path for the inflating cushion 54 that does not contain edges which may interact with the cushion 54.

The hush panel 70, namely upper and forward wall portions 73 and 75, respectively, of cavity 74, is configured to act as a reaction surface for the inflatable cushion 54 when transitioning from the non-expanded state 54A to the expanded state 54B. For example, upon actuation of the inflator 56, the inflating cushion 54 will have a rearwardly oriented component of force directed toward a rearward wall portion 77 of cavity 74, and a perpendicular, generally downward and outwardly directed component—i.e., toward floor space 40. As the cushion 54 continues to inflate, a reaction force will tend to build up along the upper and forward wall portions 73 and 75, permitting the cushion 54 to push against and break through or penetrate a cover, such as closeout door 78, and expand through cavity opening 76 into the passenger compartment 12—e.g., between the seat assembly 20 and the instrument panel 18, as seen in FIG. 1A.

According to the embodiment of FIG. 1B, the hush panel 70 includes a B-surface, closeout door 78, preferably of sufficient length and width to cover opening 76 and conceal the stowed cushion 54A. The closeout door 78 is shown with solid lines in a first, substantially closed position at 78A in FIG. 1A. As noted above, the cushion 54 functions to transition the closeout door 78 from the first position to a second, generally open position. More specifically, upon inflation of the inflatable cushion 54 to the expanded state 54B, the closeout door 78 is pushed, pressed, or forced to a second, generally open position, indicated in FIG. 1A with hidden lines at 78B. The closeout door 78 rotates or pivots about a laterally oriented hinge portion 64 to transition from the first position 78A to the second position 78B. In this particular embodiment, the laterally oriented hinge portion 64 is preferably either a butt hinge (as seen in FIG. 1A), or a plurality of fasteners, rivets, screws, or bolts (not shown herein). In addition to, or as an alternative thereof, the laterally oriented hinge portion 64 could also be configured to consist of a weakened lateral channel in the closeout door 78, such as lateral channels or tear seams 299 and 301 of FIGS. 3 and 3A.

Also note that the cavity 74 in hush panel 70 can alternatively be constructed with forward wall portions 73 and 75 but without a rearward wall portion 77. In this case, the cavity opening 76 would be on the downward and rearward sides of the cavity 74. The closeout door 78 would then cover both the downward and rearward surfaces of cavity 74. For this alternative, a portion of the hush panel may be visible by the occupants.

FIGS. 2A through 3B illustrate separate embodiments of the present invention that function similarly to the previously described knee airbag apparatus 60 of FIG. 1B, but include, among other things, variations in the configuration the hush panel and closeout door. For simplicity and brevity, like reference numbers are used in FIGS. 2A-3B to refer to like components from FIGS. 1A and 1B. Correspondingly, the components of FIGS. 2A-3B that are identified with a common reference number to a respective component of FIGS. 1A-1B should be considered identical unless specified otherwise. Furthermore, the embodiments depicted in FIGS. 2A-3B, like FIGS. 1A and 1B, are not to scale and are provided purely for clarification purposes. As such, the particular dimensions of the drawings presented herein are not to be considered limiting.

Looking now to FIG. 2A, an exploded perspective view of a knee airbag apparatus, indicated generally by reference numeral 160, is shown in accordance with an alternate embodiment of the present invention. The inflatable cushion 54 of FIGS. 1A-2A includes two side-portions 68 connected by an intermediate main portion 66, as best seen in FIG. 2A. A narrowed neck region 67, proximate to the main portion 66, includes a plurality of holes 69. Notably, other cushion constructions can be used than that shown in FIG. 2A without departing from the scope of the present invention. For example, another typical construction that may be used is a two panel construction that has forward and rearward panels that are attached to each other around their perimeters (not shown).

During assembly of the knee airbag apparatus 160, the inflator discharge port 58 is pushed, pressed, or fed into open end 62B of sleeve member 62. In turn, the neck portion 67 of the cushion 54 is slid over the sleeve member 62 and inflator 56 such that the various holes 69 align and mate with the extending mounting studs 63. Note that other inflator attachment options are possible that are not shown in the appended drawings. By way of example, the inflator 56 can be completely contained by the cushion 54 with the complementary wiring harness (not shown) extending outward therefrom. In addition, the inflator 56 can be located outside the cushion 54 with a gas transmission path into the cushion 54 via a bracket or a fill tube (neither of which are depicted herein).

Prior to, contemporaneously therewith, or thereafter, the inflatable cushion 54 is generally rolled or folded in any known manner into the first, non-expanded stowable state 54A. To prevent the inflatable cushion 54 from unrolling or unfolding, the knee airbag apparatus 160 further includes a flexible covering or penetrable membrane 180 of frangible material. The penetrable membrane 180 is used to entrap or envelop the folded cushion 54 and thereby attach the same to the closeout door 178 of FIG. 2A when in the non-expanded state 54A. The penetrable membrane 180 comprises substantially opposing forward and rearward flaps 182 and 184, respectively. Each flap 182, 184 is adhered, preformed, integral to, or otherwise rigidly attached along respective first ends 183 and 185 to the closeout door 178. Ideally, the rearward flap 184 includes a tear seam or a plurality of weakening features, collectively represented herein as a weakened portion, indicated generally as 186, comprising a plurality of indentations or slots 192. The weakened portion 186 extends generally parallel to the first end 185 of the rearward flap 184, adjacent to the closeout door 178.

The forward and rearward flaps 182, 184 also define one or more apertures 188 and 190, respectively, preferably corresponding to the number of holes 69 in the cushion 54, through respective second ends 187 and 189 of forward and rearward flaps 182 and 184. The apertures 188 are oriented along the forward flap second end 187 so as to align with the rearward flap apertures 190. Once properly aligned, the apertures 188 and 190 form an aligned set of holes (or a channel) that is configured to receive mounting studs 63 therethrough, retaining the cushion 54, inflator 56, and sleeve member 62 in an installable condition, as indicated by 160A in FIG. 2A.

The closeout door 178 includes a plurality of snap fasteners (also referred to in the art as "push-in snap-in fasteners") oriented along an outer periphery thereof. A corresponding number of fastener slots 196 are oriented along the hush panel 170 in receiving fashion to mate with a respective snap fastener 194, and thereby temporarily retain the closeout door 178 in a closed position, such as first position 78A of FIG. 1. As the snap fasteners 194 are received by a corresponding fastener slot 196, the mounting studs 63 are contemporaneously passed through mounting ports 198 formed in the upper wall portion 73 of the hush panel 170. A nut 99 is fit with each mounting stud 63, securing the cushion 54, inflator 56, and sleeve member 62 to the hush panel cavity 74.

According to the embodiment of FIG. 2A, the weakened portion 186—i.e., slots 192, are configured to weaken the rearward flap 184 at preselected locations, allowing for operative deployment of the inflatable cushion 54. More particularly, when the inflatable cushion 54 is expanded with sufficient force to overcome a predetermined, threshold fracture force, the weakened portion 186 ruptures. The cushion 54 thereafter forces the closeout door 178 open, rendering the opening 76 in the lower portion 38 of the instrument panel 18 relatively unobstructed, creating a deployment path. During opening of the closeout door 178, the forward flap 182 may stretch or bend enabling the closeout door 178 to rotate about the lateral hinge portion 64.

Looking then to FIG. 2B of the drawings, an exploded perspective illustration shows the knee airbag apparatus of FIG. 2A being attached to the lower portion 38 of the vehicle instrument panel 18. After the cushion 54, inflator 56, and sleeve member 62 are positioned within the cavity 74 and attached to the hush panel 170—e.g., via snap fasteners 194 and mounting studs 63 (FIG. 2A), the hush panel 170 is installed to the motorized vehicle, such as vehicle 10 of FIG. 1A. As shown in FIG. 2B, a plurality of non-releasing fasteners 72 are configured to attach the hush panel 170 to the lower portion 38 of the instrument panel 18 at preselected locations. It is desirable that the hush panel 170 be rigidly attached to first and second knee bolster brackets 122 and 124, respectively, at respective first and second laterally extending flange portions 123 and 125. Depending upon the locations of fasteners 72, one or more fastener pass-through holes 127 may need to be defined in the closeout door 178 so that proper fastener attachment can still be made and so that the closeout door 178 can still open upon deployment or activation of the knee airbag apparatus 160.

FIGS. 3-3B of the drawings illustrate a knee airbag apparatus, indicated generally at 260 in FIG. 3A, in accordance with another alternate embodiment of the present invention. Similar to the knee airbag apparatus 60 and 160 of FIGS. 1A and 2A, the knee airbag apparatus 260 of FIG. 3 is oriented at the lower portion 38 of the instrument carrier 18. The knee airbag apparatus 260 includes an inflatable cushion 54 stowed inside of a cavity 74 formed by the hush panel 270. Functioning in a manner similar to the knee airbag apparatus 60 of FIG. 1A, an inflation fluid dispensing apparatus 56 is in fluid communication with the cushion 54 to regulate inflation of the cushion 54.

The primary distinguishing feature of FIG. 3A is the relative orientation of the snap fastener 294. More specifically, the closeout door 278 includes a first and a second plurality of snap fasteners 294 and 296, respectively, oriented along an outer periphery thereof, proximate to forward and rearward ends 295 and 297, respectively, as best seen in FIG. 3A. Each of the first and second pluralities of snap fasteners are configured to mate with the hush panel 270, and thereby temporarily retain the closeout door 278 in a substantially closed position, such as first position 78A of FIG. 1A.

Preselected fasteners can be preformed or fabricated with a weakened portion that is configured to weaken that respective fastener. According to the embodiment of FIG. 3, each one of the second plurality of snap fasteners 296 includes an indentation or slot 300, allowing for operative deployment of the inflatable cushion 54. More particularly, when the inflatable cushion 54 is expanded—i.e., transitions from the first, non-expanded state 54A to the second, expanded state 54B, with sufficient force to overcome a predetermined, threshold fracture force, the indentations 300 fail, causing the respective snap fasteners 296 to rupture. The cushion 54 thereafter forces the closeout door 278 open, possibly rotating about weakened hinge line 299 in proximity to the first plurality of snap fasteners 294, rendering the opening 76 in the lower portion 38 of the instrument panel 18 relatively unobstructed, creating a deployment path therethrough.

Alternatively, or in addition to weakening a preselected number of fasteners, such as the second plurality of snap fasteners 296, a tear seam or weakening channel 301 may be incorporated into a rearward portion of the closeout door 278, as illustrated in FIGS. 3 and 3A. In this instance, the tear seam 301 would be configured or designed to fail or rupture to create the deployment path for the inflating cushion 54.

While the best modes for carrying out the present invention have been described in detail herein, those familiar with the art to which this invention pertains will recognize various alternative designs and embodiments for practicing the invention within the scope of the appended claims.

The invention claimed is:

1. A supplemental inflatable restraint system for a vehicle having a passenger compartment with an instrument panel at a forward end therein, the instrument panel having an upper, middle, and lower portion, comprising:
    a panel member operatively attached to the lower portion of the instrument panel in a generally horizontal orientation, said panel member defining a cavity with an opening, said cavity configured to nest the supplemental inflatable restraint system therein;
    an inflatable cushion operable to transition through said opening from a non-expanded state in which said cushion is substantially inside said cavity to an expanded state in which said cushion is substantially outside said cavity; and
    a fluid dispensing apparatus in operative fluid communication with said cushion to selectively regulate transition of said cushion from said non-expanded state to said expanded state.

2. The supplemental inflatable restraint system of claim 1, wherein said panel member is configured to act as a reaction surface for said inflatable cushion when transitioning from said non-expanded state to said expanded state.

3. The supplemental inflatable restraint system of claim 1, wherein said panel member is characterized by an absence of an exterior surface with an appearance finish.

4. A supplemental inflatable restraint system for a vehicle having a passenger compartment with an instrument panel at a forward end therein, the instrument panel having an upper, middle, and lower portion, comprising:
    a panel member operatively attached to the lower portion of the instrument panel, said panel member defining a cavity with an opening, said cavity configured to nest the supplemental inflatable restraint system therein;
    an inflatable cushion operable to transition through said opening from a non-expanded state in which said cushion is substantially inside said cavity to an expanded state in which said cushion is substantially outside said cavity;
    a fluid dispensing apparatus in operative fluid communication with said cushion to selectively regulate transition of said cushion from said non-expanded state to said expanded state; and
    a plurality of non-releasing fasteners operatively configured to attach said panel member to the lower portion of the instrument panel at preselected locations.

5. The supplemental inflatable restraint system of claim 1, wherein said panel member includes a lip portion extending generally rearward with respect to the vehicle and wrapping around a bottom edge of the lower portion of the instrument panel.

6. The supplemental inflatable restraint system of claim 1, further comprising:
    a closeout door operatively attached to said panel member and configured to substantially cover said cushion when in said non-expanded state, wherein said cushion is in operative communication with said closeout door to transition said closeout door from a first substantially closed position to a second generally open position.

7. The supplemental inflatable restraint system of claim 6, wherein said closeout door pivots about a generally laterally oriented hinge portion to transition from said first substantially closed position to said second generally open position.

8. The supplemental inflatable restraint system of claim 7, wherein said laterally oriented hinge portion comprises one of a butt hinge, a plurality of fasteners, rivets, screws, or bolts, and a laterally oriented weakening channel.

9. A supplemental inflatable restraint system for a vehicle having a passenger compartment with an instrument panel at a forward end therein, the instrument panel having an upper, middle, and lower portion, comprising:
    a panel member operatively attached to the lower portion of the instrument panel, said panel member defining a cavity with an opening, said cavity configured to nest the supplemental inflatable restraint system therein;
    an inflatable cushion operable to transition through said opening from a non-expanded state in which said cushion is substantially inside said cavity to an expanded state in which said cushion is substantially outside said cavity;
    a fluid dispensing apparatus in operative fluid communication with said cushion to selectively regulate transition of said cushion from said non-expanded state to said expanded state; and
    a closeout door operatively attached to said panel member and configured to substantially cover said cushion when in said non-expanded state, wherein said cushion is in operative communication with said closeout door to transition said closeout door from a first substantially closed position to a second generally open position;
    wherein said closeout door includes a plurality of snap fasteners oriented along an outer periphery thereof, each of said plurality of snap fasteners configured to mate with said panel member and thereby temporarily retain said closeout door in said first position.

10. The supplemental inflatable restraint system of claim 9, wherein preselected ones of said plurality of snap fasteners define an indentation or slot operatively configured to weaken said preselected ones of said plurality of snap fasteners.

11. A supplemental inflatable restraint system for a vehicle having a passenger compartment with an instrument panel at a forward end therein, the instrument panel having an upper, middle, and lower portion, comprising:
    a panel member operatively attached to the lower portion of the instrument panel, said panel member defining a cavity with an opening, said cavity configured to nest the supplemental inflatable restraint system therein;
    an inflatable cushion operable to transition through said opening from a non-expanded state in which said cushion is substantially inside said cavity to an expanded state in which said cushion is substantially outside said cavity;
    a fluid dispensing apparatus in operative fluid communication with said cushion to selectively regulate transition of said cushion from said non-expanded state to said expanded state;
    a closeout door operatively attached to said panel member and configured to substantially cover said cushion when in said non-expanded state, wherein said cushion is in operative communication with said closeout door to transition said closeout door from a first substantially closed position to a second generally open position; and a penetrable membrane configured to at least partially wrap said inflatable cushion and thereby attach the same to said closeout door when in said non-expanded state.

12. The supplemental inflatable restraint system of claim 11, wherein said penetrable membrane comprises substantially opposing forward and rearward flaps each attached along a respective first end to said closeout door, said forward and rearward flaps each defining at least one aperture through a respective second end, wherein said at least one forward flap aperture is oriented along said respective second end so as to align with said at least one rearward flap aperture to thereby define a channel configured to receive a mounting element therethrough.

13. The supplemental inflatable restraint system of claim 12, wherein said rearward flap includes a weakened portion extending generally parallel to said respective first end and adjacent to said closeout door.

14. A knee airbag apparatus for use with a vehicle having an instrument panel with upper and lower portions extending in a rearward direction relative to the motorized vehicle, and a middle portion extending therebetween, comprising:

a hush panel operatively attached to the lower portion of the instrument panel, said hush panel defining a cavity with an opening facing in a generally downward direction, said cavity configured to nest the knee airbag apparatus therein;

an inflatable cushion operable to transition through said opening from a non-expanded state in which said cushion is inside said cavity to an expanded state in which said cushion is substantially outside said cavity;

a fluid dispensing apparatus in operative fluid communication with said cushion to selectively regulate transition of said cushion from said non-expanded state to said expanded state; and a closeout door operatively attached to said hush panel to substantially cover said cushion when in said non-expanded state, said closeout door configured to transition from a first substantially closed position to a second generally open position;

wherein said hush panel is substantially nonvisible to a vehicle occupant seated upright and adjacent thereto; and wherein said hush panel acts as a reaction surface for said inflatable cushion when transitioning from said non-expanded state to said expanded state.

15. The knee airbag apparatus of claim 14, wherein said hush panel is characterized by an absence of an outer surface with an appearance finish.

16. The knee airbag apparatus of claim 15, wherein said closeout door pivots about a generally laterally oriented hinge portion to transition from said first substantially closed position to said second generally open position.

17. The knee airbag apparatus of claim 16, wherein said closeout door includes at least one of a tear seam and a weakening channel extending generally parallel to said laterally oriented hinge portion.

18. The knee airbag apparatus of claim 14, wherein said closeout door includes a plurality of snap fasteners oriented along an outer periphery thereof, each of said plurality of snap fasteners configured to mate with said panel member and thereby temporarily retain said closeout door in said first position.

19. The knee airbag apparatus of claim 18, further comprising:

a penetrable membrane comprising substantially opposing forward and rearward flaps each attached along a respective first end to said closeout door and configured to at least partially wrap said inflatable cushion therebetween, said forward and rearward flaps each defining at least one aperture through a respective second end, wherein said at least one forward flap aperture is oriented along said respective second end so as to align with said at least one rearward flap aperture to thereby define a channel configured to receive a mounting element therethrough.

20. A vehicle having a passenger compartment, comprising:

an instrument panel disposed at a forward end of the vehicle passenger compartment, said instrument panel having upper and lower portions extending generally rearward relative to the vehicle and a middle portion extending therebetween, said upper and middle portions including an exterior surface characterized by an appearance finish;

a supplemental inflatable restraint system, including:

a hush panel operatively attached to said lower portion of said instrument panel, said hush panel defining a cavity with an opening facing in a generally downward direction relative to the vehicle, said cavity configured to receive and nest said supplemental inflatable restraint system therein;

an inflatable cushion operable to transition through said opening from a non-expanded state in which said cushion is inside said cavity to an expanded state in which said cushion is substantially outside said cavity;

a fluid dispensing apparatus in operative fluid communication with said cushion to selectively regulate transition of said cushion from said non-expanded state to said expanded state; and a closeout door operatively attached to said hush panel to substantially cover said cushion when in said non-expanded state, said cushion being in operative communication with said closeout door and thereby configured to transition said closeout door from a first substantially closed position to a second generally open position;

wherein said hush panel is substantially nonvisible to a vehicle occupant seated upright and adjacent thereto; and wherein said hush panel is characterized by an absence of an exterior surface with an appearance finish.

* * * * *